United States Patent
Lindgarde

(10) Patent No.: US 7,721,686 B2
(45) Date of Patent: May 25, 2010

(54) METHOD AND SYSTEM FOR CONTROLLING A FREE-PISTON ENERGY CONVERTER

(75) Inventor: Olof Lindgarde, Mölndal (SE)

(73) Assignee: Volvo Technology Corporation, Göteborg (SE)

( * ) Notice: Subject to any disclaimer, the term of this patent is extended or adjusted under 35 U.S.C. 154(b) by 711 days.

(21) Appl. No.: 11/570,349

(22) PCT Filed: Apr. 19, 2005

(86) PCT No.: PCT/EP2005/004165

§ 371 (c)(1),
(2), (4) Date: Dec. 11, 2006

(87) PCT Pub. No.: WO2005/100764

PCT Pub. Date: Oct. 27, 2005

(65) Prior Publication Data

US 2009/0031991 A1 Feb. 5, 2009

(30) Foreign Application Priority Data

Apr. 19, 2004 (WO) ............... PCT/EP2004/004140

(51) Int. Cl.
*F01B 23/10* (2006.01)
*F01B 7/02* (2006.01)
*F01B 11/00* (2006.01)

(52) U.S. Cl. .................... 123/46 R; 123/46 E
(58) Field of Classification Search ............. 123/46 R, 123/43 E; 290/4 R, 2; 322/3; 60/595, 645, 60/649, 659; 74/7 R, 6; 415/117, 43, 17; 336/65; *F01B 23/10, 7/02, 11/00*

See application file for complete search history.

(56) References Cited

U.S. PATENT DOCUMENTS

| 3,643,638 A | 2/1972 | Braun |
| 4,532,431 A | 7/1985 | Iliev et al. |
| 4,653,274 A | 3/1987 | David |
| 5,002,020 A | 3/1991 | Kos |
| 5,287,827 A | 2/1994 | Amendinger et al. |

(Continued)

FOREIGN PATENT DOCUMENTS

WO       97/28362 A      8/1997

(Continued)

OTHER PUBLICATIONS

International Search Report for corresponding International Application PCT/EP2004/004140.

(Continued)

Primary Examiner—Stephen K Cronin
Assistant Examiner—Keith Coleman
(74) Attorney, Agent, or Firm—WRB-IP LLP

(57) ABSTRACT

A method and system for controlling a free-piston energy converter is disclosed in which effects of events, like combustion events, in at least one of at least two cylinders, are decoupled from each other by predicting forces acting on the moving mass of the converter during a stroke of the moving mass and by evaluating or estimating a value representing a force which is exerted onto the moving mass, so that the moving mass reaches a desired reference condition or state, like a desired reference kinetic energy, at a certain position along the stroke.

17 Claims, 5 Drawing Sheets

U.S. PATENT DOCUMENTS

| | | | |
|---|---|---|---|
| 6,181,110 B1 * | 1/2001 | Lampis | 322/3 |
| 6,532,916 B2 * | 3/2003 | Kerrebrock | 123/46 E |
| 6,759,755 B2 * | 7/2004 | Sagov | 290/1 R |
| 7,318,506 B1 * | 1/2008 | Meic | 290/1 A |

FOREIGN PATENT DOCUMENTS

| | | |
|---|---|---|
| WO | 02/40843 A | 5/2002 |
| WO | 2004025098 A | 3/2004 |

OTHER PUBLICATIONS

The Control Handbook, pp. 731-747 (William S. Levine, ed., 1996).

International Search Report from corresponding International Application PCT/EP2005/004165.

International Preliminary Examination Report from corresponding International Application PCT/EP2005/004165.

Written Opinion from corresponding International Application PCT/EP2005/004165.

International Search Report and Written Opinion from PCT/EP2004/004140 (priority application).

Goertz, M and Peng, L., Free piston engine its application and optimization, (2002) SAE Technical Paper Series. 2000-01-0996.

Johansen, T.A., Egeland, O., Jonannessen, E., and Kvamsdal, R, Free-piston diesel engine timing and control toward electronic cam- and crankshaft, (2002) IEEE Transactions on Control Systems Technology 10(2), 177-190.

Larmi, M., Isaksson, S, Tikkannen, S., and Lammila, M., Performance simulation of a compression ignition free piston engine (2001), SAE Technical Paper Series 2001-01-0280.

Pavel, N., Michael, S., and Ondrej, V., Modeling and Control of Linear Combustion Engine, (2004) In: IFAC Symposium on Advances in Automotive Control. Italy.

\* cited by examiner

METHOD AND SYSTEM FOR CONTROLLING A FREE-PISTON ENERGY CONVERTER

The invention relates to a method and system for controlling a free-piston engine or energy converter.

A free-piston energy converter has at least one freely moving piston in at least one cylinder usually without any crankshaft or camshaft connected to the piston. This allows a highly compact and efficient engine design, but requires an exact control of the piston motion and of the actuation and motion of the valves for opening and closing inlet and outlet ports in the at least one cylinder. These motions and actuations are controlled by a control system which fulfills the function of an electronic crankshaft and an electronic camshaft.

The free piston energy converter is usually provided for converting combustion energy into electrical or mechanical or hydraulic energy.

One of the advantages of such a free piston engine is the fact that the compression ratio can be controlled at each stroke. This is not possible in a conventional combustion engine. This property opens up the possibility to achieve a homogeneous charge compression ignition (HCCI) in a free piston energy converter. A disadvantage of such an engine however is the fact, that it is difficult to provide a control system which is robust to disturbances.

The reliability and efficiency of such a free piston energy converter comprising for example one piston in one cylinder is very sensitive to disturbances because the two pistons are strongly coupled to each other and any event affecting one piston affects the other piston as well.

U.S. Pat. No. 6,181,110 discloses a method for controlling the movement of a linear electric generator which comprises a pair of internal combustion pistons disposed axially aligned and in opposition to each other, in which current absorption is controlled in such a manner that, during a reciprocating motion cycle of the generator, a resisting force acting on the generator is obtained which is substantially proportional to the movement speed of the generator at least at a central stroke area.

It is desirable to provide a method and system for controlling a free piston energy converter by which a robust control of the free piston energy converter is obtained even in case of disturbance events affecting the at least one piston and/or cylinder.

It is desirable to provide a method and system for controlling a free piston energy converter which comprises one piston in one cylinder for converting combustion energy into electrical and/or mechanical or any other kind of energy by which an efficient control of the converter is achieved, at least substantially independently of any disturbances and/or environmental conditions affecting at least one of the pistons and/or the processes in at least one of the two cylinders.

According to an aspect of the present invention, a method for controlling a free-piston energy converter by an electromagnetic force exerted onto a moving mass of the converter, by which method effects of disturbance events in at least one of at least two cylinders are decoupled from each other, comprises predicting forces acting on the moving mass of the converter during a stroke of the moving mass, wherein predicting forces is conducted based on at least one of certain present states and conditions within the converter, and evaluating or estimating on the basis of the predicted forces a value for generating the electromagnetic force which is exerted onto the moving mass, so that the moving mass reaches a desired reference condition or state, at a certain position along the stroke.

According to another aspect of the present invention, a system for controlling a free-piston energy converter for conducting a method as described above is also disclosed.

According to another aspect of the present invention, a free-piston energy converter comprising a system for controlling a free-piston energy converter for conducting a method as described above is also disclosed.

BRIEF DESCRIPTION OF THE DRAWINGS

Further details, features and advantages of the invention result from the following description of exemplary embodiments of the invention in connection with the drawings in which schematically shows.

DETAILED DESCRIPTION

Figure 1:
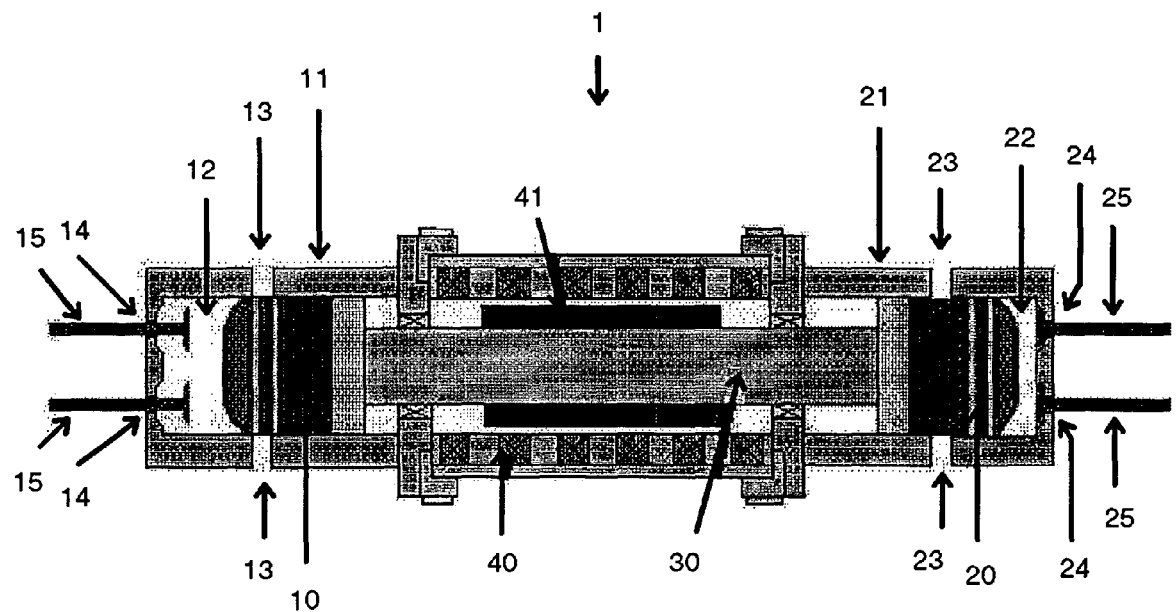
FIG. 1 a cross section through a free piston energy converter.

FIG. 1 shows a cross section through an exemplary free piston energy converter 1. This converter 1 comprises a first piston 10 moving within a first cylinder 11 with a first combustion chamber 12 and a second piston 20 moving within a second cylinder 21 with a second combustion chamber 22.

The first cylinder 11 has a first and a second intake opening 13 which is opened and closed by the first piston 10 and a first and a second inlet and/or outlet opening 14 which is opened and closed by a first and a second valve 15, respectively. The second cylinder 21 accordingly comprises a first and a second intake opening 23 which is opened and closed by the second piston 20 and a first and a second inlet and/or outlet opening 24 which is opened and closed by a first and a second valve 25, respectively.

The first piston 10 and the second piston 20 are connected with each other by a connecting shaft 30. Furthermore, an electrical machine is positioned between the first and the second cylinder 11, 12. This electrical machine substantially comprises at least one coil 40 which is fixed around the shaft 30 and at least one permanent magnet 41 which is fixed at the shaft 30. The coil 40 and the permanent magnet 41 are dimensioned and positioned in such a way that they can interact electromagnetically with each other, so that an axial movement of the permanent magnet 41 within the coil 40 induces an electrical current within the coil 40 and conversely by applying an electrical current at the coil 40 an axial force can be exerted onto the permanent magnet 41. Consequently the electric machine can operate both as a generator and as a motor.

Furthermore actuators for actuating the first and second valves 15, 25, injectors for injecting fuel and/or gas etc., as well as sensors for detecting various operating conditions like temperature, pressure, positions of the pistons 10, 20 etc. are provided for the free piston energy converter 1 and are not shown in FIG. 1.

Figure 2:
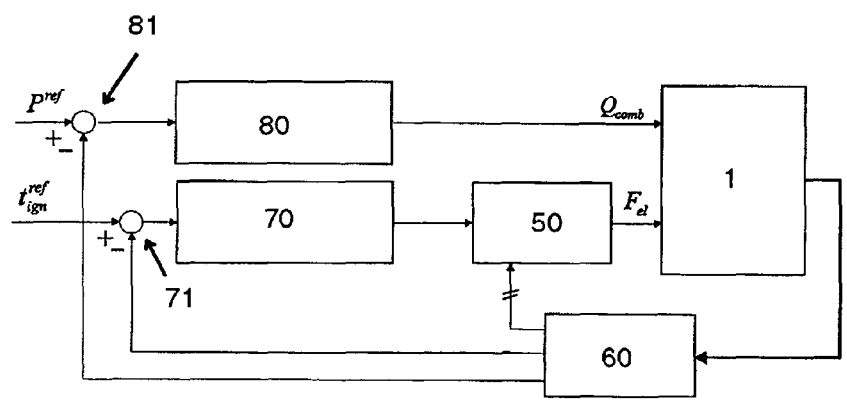
FIG. 2 a block diagram of the main components of an inventive system.

FIG. 2 shows a block diagram of the main components and the main structure of an exemplary system according to the invention for controlling a free piston energy converter 1. This system substantially comprises a velocity servo controller 50, an observer 60, an ignition time controller 70 and an output power controller 80. A main feature of this control system is that it decouples the effects of the combustions in the two cylinders 11, 21.

A first input of this system is provided for applying a reference output power value $P^{ref}$ of the converter 1 which is connected via a first summation device 81 with the output power controller 80. A second input of the system is provided for applying a reference value for the ignition time $t_{ign}^{ref}$ with respect to the top dead center (TDC) or the bottom dead center (BDC) of a piston 10; 20, which is connected via a second summation device 71 with the ignition time controller 70.

The preferred two main control variables for the converter 1 are the electromagnetic force $F_{el}$ acting on the moving mass of the converter 1 (i.e. the pistons 10, 20, the shaft 30 and the permanent magnet 41) and the fuel input $Q_{comb}$ to the converter 1. The preferred output values to be controlled by these variables are the ignition time with respect to the top dead center (TDC) or the bottom dead center (BDC) of a piston 10; 20 and the output power of the converter 1, respectively.

In order to improve performance a feedforward controller can be used from the reference signals $P^{ref}$ and $t_{ign}^{ref}$ to the control commands $Q_{comb}$ and $F_{el}$. For the sake of clarity a feedforward controller is not indicated in FIG. 2.

Other control variables which could be used but are preferably not considered are the valve opening times, the fuel injection times and the current control of the electrical machine so that the desired electromagnetic force is obtained. Similarly, the outputs to be controlled might be for example the output power and the maximum efficiency of the converter 1 under certain environmental restrictions and conditions instead of the ignition time. The general function of the velocity servo controller 50 is to predict forces acting on the moving mass of the converter 1 during a stroke of the pistons 10, 20 and the shaft 30 and to evaluate and/or estimate a value representing an electromagnetic force Fei which is converted by a converting device (not shown) into an appropriate current for the coils 40 so that the moving mass reaches a desired reference condition or state, preferably a desired reference kinetic energy, at a certain position along the stroke and preferably near the end of the stroke within the related cylinder 11, 21 and especially at the next combustion event. By introducing such a velocity servo controller 50 the feedback-control system is made much more robust to process disturbances.

The general function of the observer 60 is to observe and estimate certain current (present) states and/or conditions within the free piston energy converter 1 which are used and evaluated especially by the velocity servo controller 50 for predicting the future development or future values of the above mentioned forces.

For this purpose inputs of the observer 60 are connected with related sensor outputs of the converter 1 and several first outputs of the observer 60 are connected with inputs of the velocity servo controller 50.

A second output of the observer 60 is connected to the second summation device 71, so that a difference between the value of the reference ignition time and the value of an estimated ignition time is input to the ignition time controller 70, the output of which is connected with the velocity servo controller 50.

Finally a third output of the observer 60 is connected to the first summation device 81, so that a difference between the value of the reference output power and the value of an estimated output power is input to the output power controller 80 which generates at its output a value for the fuel input $Q_{comb}$ to the converter 1 for controlling a related fuel injection device.

By means of this system the converter 1 is controlled in such a way that by inputting a reference value of an output power $P^{ref}$ and a reference value of the ignition time $t_{ign}^{ref}$, a desired output power P and a desired ignition time $t^{ign}$ with respect to TDC or BDC is obtained by controlling the electromagnetic force $F_{el}$ acting on the moving mass of the converter 1 and the fuel input $Q_{comb}$.

In order to control the free piston energy converter 1 with such a system the following observations have to be considered: the converter 1 as such is an unstable system and the combustion process is nonlinear. Furthermore, the converter 1 is sensitive to process disturbances like for example to a sudden decrease in combustion energy. Finally, the converter 1 is an event triggered system and has multiple inputs and multiple outputs (MIMO).

As mentioned above the reason for being sensitive to disturbances is that the combustion properties of the two cylinders 11, 21 are strongly coupled. A disturbance in one of the cylinders 11 (21) affects the combustion event in the other cylinder 21 (11) which in turn affects the combustion in the first cylinder 11 (21) and so on. Consequently a robust event triggered system is needed which is more robust to disturbances and which is able to control a free piston energy converter 1 with multiple inputs and multiple outputs (MIMO).

Generally this is achieved by the method and system according to the invention by decoupling the effects of the combustions in the two cylinders 11, 21.

In order to decouple these effects, the system design with respect to the velocity servo controller 50 and the observer 60 is provided as follows:

The design of the velocity servo controller 50 is based on a reference value which is for example a desired kinetic energy of the piston 10; 20 at a certain point of its stroke and especially near the end of the stroke (or another condition or state of the converter 1) (This is in contrary to the prior art in which usually a position or velocity trajectory during the whole stroke is followed). The desired reference kinetic energy of the piston is achieved by controlling the electrical machine by the velocity servo controller 50 and especially by generating a value for converting into a current for the coils 40 so that an appropriate electromagnetic force Fei is exerted onto the permanent magnets 41. This feature increases the degree of freedom when designing the controller.

Furthermore, the design of the velocity servo controller 50 is based on a model. This means that the output value of the velocity servo controller 50 (the value for generating the applied electromagnetic force) for controlling the electrical machine is evaluated on the basis of a model of the moving mass of the pistons 10, 20 and the shaft 30 and on pressure-, position- and velocity-signals within the free piston energy converter 1 especially according to the description below.

For estimating the position and velocity of the moving mass of the converter 1, the observer 60 is based on a physical model of how the moving mass is moving with respect to the applied total forces (i.e. substantially electromagnetic force and gas pressure within the cylinder). Such an observer 60 can also be used for fault detection (e.g. faults in Hall effect sensors, in pressure sensors, in the electric machine etc.). For estimating the pressure, a model based filtering of pressure signals can be introduced additionally.

Figure 3:
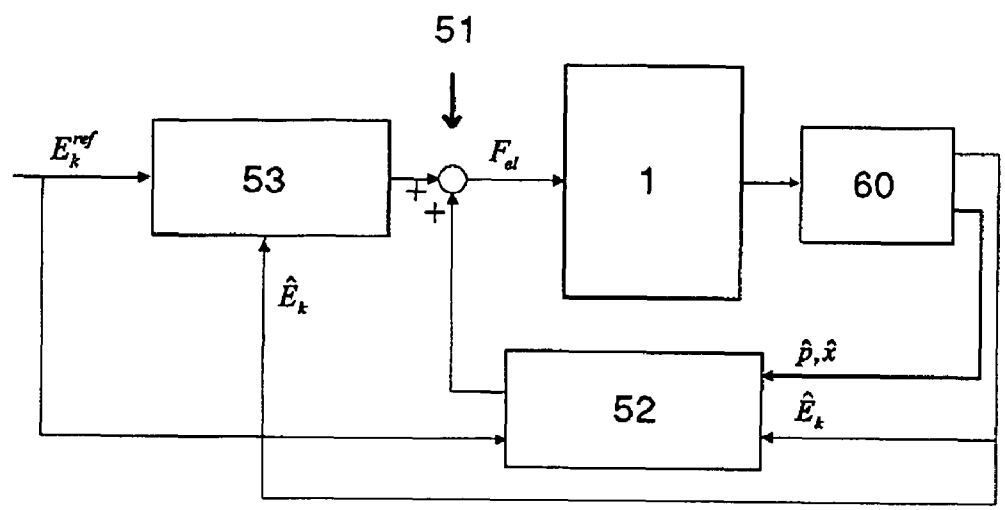
FIG. 3 a block diagram of a first component of the system according to FIG. 2.

The velocity servo controller 50 is shown in more details in the block diagram according to FIG. 3 in which the free piston energy converter 1 and the observer 60 are indicated as well. The servo controller 50 substantially comprises a stabilizing compensator 52 and a servo compensator 53, for example a Pi-controller. Preferably this is a standard configuration of a controller that solves the robust servo mechanism problem (see for example in Levine, W. S.: The Control Handbook, CRC Press 1996 on page 734).

The stabilizing compensator 52 receives input signals evaluated by the observer 60 which indicate the estimated pressure p within the cylinders and the estimated kinetic energy $E_k$ of the moving mass at an estimated (current or present) position x. Furthermore the stabilizing compensator 52 receives the value of the desired reference kinetic energy $E_k^{ref}$ near the end of the stroke of the piston (or at a certain position of the piston) which is set by the ignition time controller 70. A value of the electromagnetic force $F_{el}$ which is the output signal of the stabilizing compensator 52 and which is computed by this from the received input signals is fed to a third summation device 51. A first input of the servo compensator 53 receives the value of the desired reference kinetic energy $E_k^{ref}$ and a second input receives the value of the kinetic energy $E_k$ estimated by the observer 60. The output of the servo compensator 53 is connected with the third summation device 51. By this, the sum of the output signals of the stabilizing compensator 52 and the servo compensator 53 is fed as a value of the electromagnetic force $F_{el}$ to a converting device (not shown) for generating the appropriate current for the coils 40 in the converter 1 as mentioned above.

Figure 4:
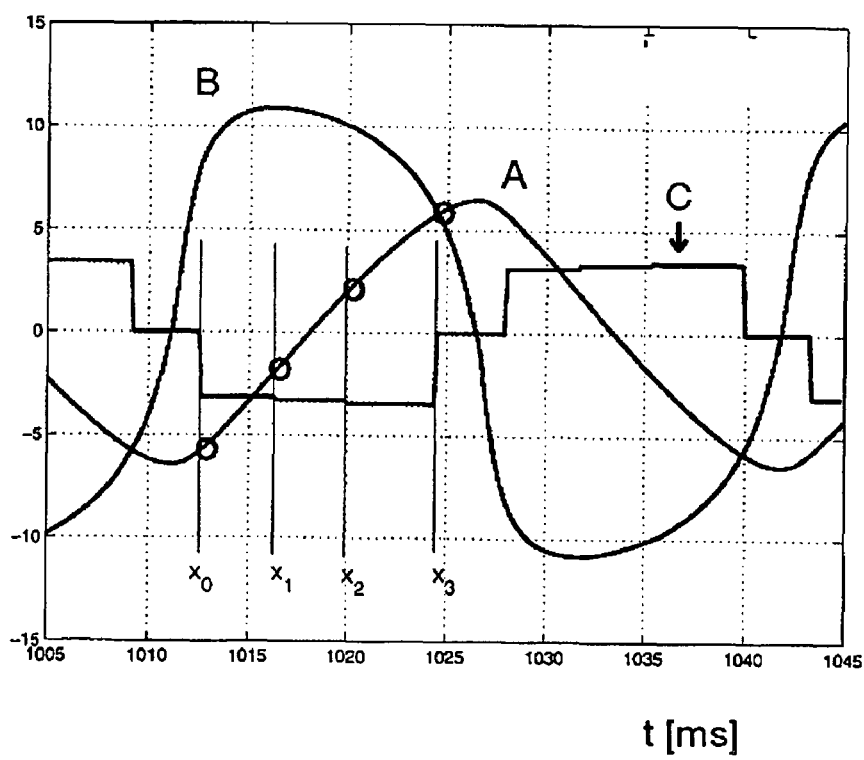
FIG. 4 the results of inventive simulation example describing the features of the first main component of the inventive system.

The model based simulation conducted by the velocity servo controller 50 and especially by the stabilizing compensator 52 shall be explained exemplarily with reference to FIG. 4. This Figure shows how the velocity servo controller 50 applies the value for the electromagnetic force $F_{el}$ by predicting the forces that are acting on the moving mass during the stroke of the piston. The following algorithm is conducted:

1. Measuring or estimating the values of the kinetic energy $E_k$ (or velocity v) of the piston and the pressure p within the related cylinder at a first position $x_0$;
2. Considering the desired reference kinetic energy $E_k^{ref}$ near the end of the stroke or at a certain position $x_3$;
3. Predicting a constant electromagnetic force $F_{el}$ so that the desired reference kinetic energy $E_k^{ref}$ is reached at the position $x_3$ on the basis of the values measured or estimated under step 1 above; and
4. Jumping back to step 1 and repeating the procedure for a second (next) position $x_1$ of the piston.

In FIG. 4 curve A indicates the positions $x_i$ of the piston, curve B indicates the velocity v (kinetic energy $E_k$) of the piston and curve C indicates the value of the requested electromagnetic force Fei at the output of the velocity servo controller 50, each over the time t which is indicated on the horizontal axis. In case of a perfect prediction of the electromagnetic force Fel, this force would be constant throughout the whole stroke. However as shown in FIG. 4 this prediction is usually not exact because of disturbances and model imperfections. Consequently the electromagnetic force changes during the stroke as indicated in FIG. 4.

The electromagnetic force $F_{el}$ is computed by the stabilizing compensator 52 in the following way:

1. Energy Balance:

Let $x_{range}$ denote the distance where force is applied by the electrical machine. Let $x_1$ and $x_2$ denote the positions where the electromagnetic force starts and ends, i.e. $(x_1-x_2)=x_{range}$. This same notations hold for the pressure $p_1$ and $p_2$ and the velocity $v_1$ and $v_2$.

The robust servomechanism problem is stated as follows: Given an initial speed $v_1$ and an initial pressure $p_1$ and design a robust stabilizing controller such that $$v_2 = v_{ref} \tag{1}$$

Here $v_{ref}$ denotes the desired speed at $x_2$. Furthermore, let the electromagnetic force $F_{el}$ be constant during the stroke, i.e.

$$F_{el} = \text{constant for } x_1 > x > x_2 \tag{2}$$

Observe that the applied work is equal to the loss of kinetic energy, i.e.

$$\int_{x_1}^{x_2} F_{tot}(x)(dx) = \tfrac{1}{2}m(v_2^2 - v_1^2) \tag{3}$$

Let the total force be the sum of the electromagnetic force, the force due to the pressure p(t) from the two cylinders, and by other forces $F_\Delta$ which may be due to non-modelled effects (friction, heat loss, etc.) and process disturbances, i.e.

$$F_{tot} = F_{el} + pA + F_\Delta \tag{4}$$

Let the electromagnetic force $F_{el}$ be the sum of the output from the servo compensator Felserv and the stabilizing compensator $F_{el}^{stab}$. Hence from (2) to (4) it follows that:

$$(F_{el}^{stab} + F_{el}^{serv})x_{range} + \int_{x_1}^{x_2}(Ap(x) + F_\Delta)dx = \tfrac{1}{2}m(v_2^2 - v_1^2) \tag{5}$$

Assume that the output from the servo compensator is given by:

$$F_{el}^{serv} x_{range} + \int_{x_1}^{x_2} F_\Delta dX = 0 \tag{6}$$

Hence from (5) and (6) it follows that the servo problem (1) is solved if:

$$F_{el}^{stab} = m(v_{ref}^2 - v_1^2)/2x_{range} - A/x_{range} \int_{x_1}^{x_2} p(x)dx \tag{7}$$

2. Predicting the Pressure Profile:

Consider one side of the piston. Let x denote the distance between the cylinder head and the piston. Under adiabatic expansion (or compression) of an ideal gas it holds that:

$$dp/p = -\kappa dx/x \tag{8}$$

Assuming that $\kappa$ is constant throughout the stroke. Integrating (8) over an interval $x \in [x_a, x_b]$ it follows that:

$$[\ln(\Phi)]_{p(xz)}^{p(xb)} = \kappa[\ln(s)]_{xz}^{xb} \tag{9}$$

$$p(x_b)/p(x_a) = (x_b/x_a)^{-\kappa} \tag{10}$$

Hence $$A\int_{x_a}^{x_b} p(s)ds = Ap(x_a)/x_a^{-\kappa}[s^{1-\kappa}/1-\kappa]_{xz}^{xb} \tag{11}$$

$$= Ap(x_a)/(1-\kappa)x_a^{-\kappa}(x_b^{1-\kappa} - x_a^{1-\kappa})$$

$$= Ap(x_a)/(1-\kappa)((x_b/x_a)^{1-\kappa} - 1)$$

Consider the compression phase of a free piston engine. Let XiV0 denote the position where the inlet valves (or ports) are opened and closed. Also, let pin denote the pressure in the cylinder when the inlet ports are open. The work $W_{com}$ that the gas is carrying out on the piston over $x \in [x_1\ x_2]$ then given by:

$$W_{com} = Ax_{ivo}p_{in}(1-\kappa)((x_2/x_{ivo})^{1-\kappa}-1) + Ap_{in}(x_{ivo}-x_1) \quad (12)$$

(12) The same method of calculation can be made on the work $W_{exp}$ that is applied on the piston during an expansion phase. From (7) it now follows that $F_{el}^{stab}$ is given by:

$$F_{el}^{stab} = m(v_{ref}^2 - v_1^2)/2x_{range} - (W_{com} + W_{exp})/x_{range} \quad (13)$$

3. Updating the electromagnetic force $F_{el}$ during the stroke:

In Section 1. and 2. is has been assumed that the electromagnetic force $F_{el}$ is constant throughout the stroke. However from equation (13) it is straightforward to update the electromagnetic force $F_{el}$ during the stroke at arbitrary positions $x_i$. Updating the force during the stroke improves robustness since the controller has a larger possibility to reach the desired reference kinetic energy $E_k^{ref}$.

Figure 5:
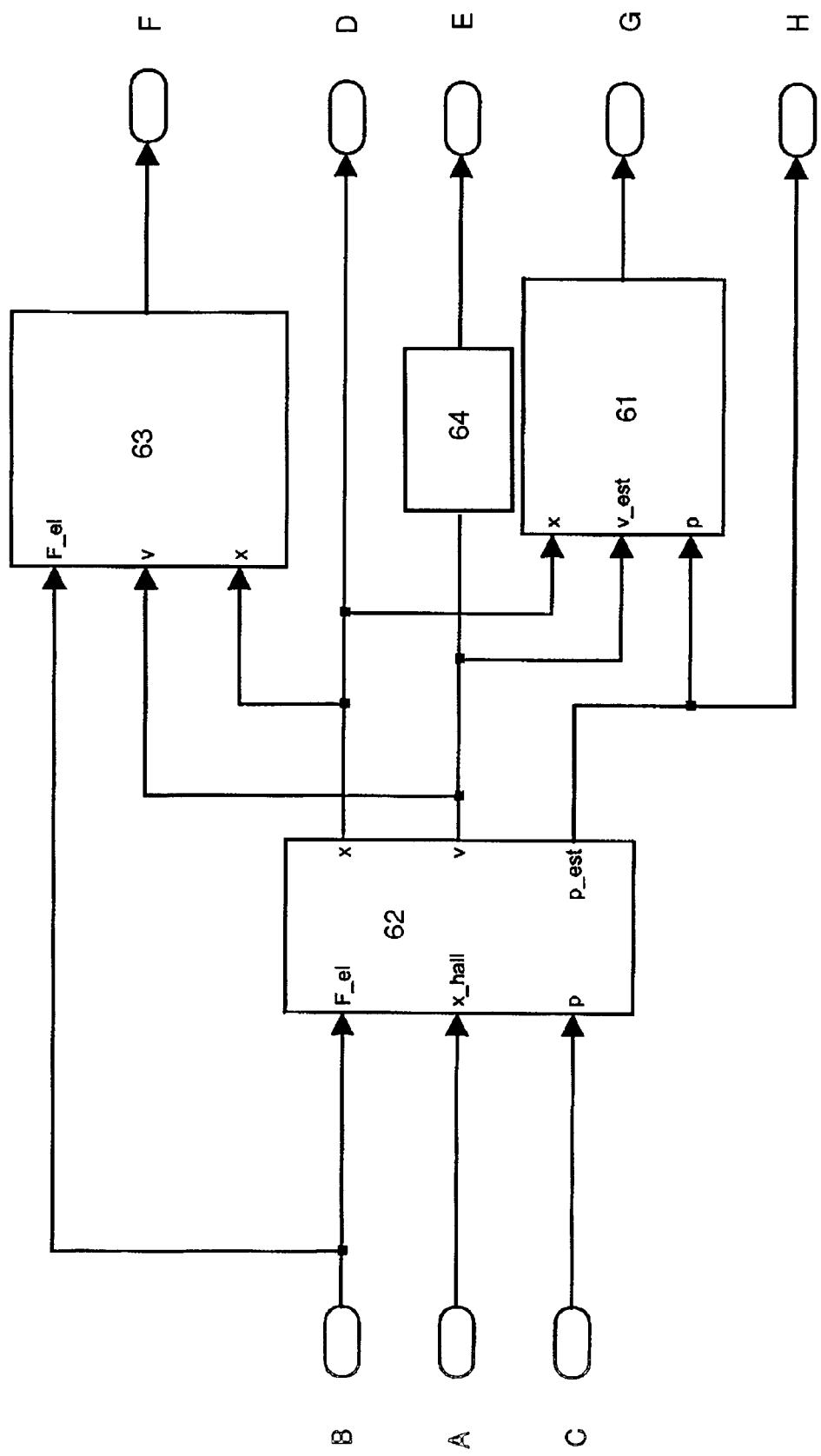
FIG. 5 a block diagram of a second component of the system according to FIG. 2.

The observer 60 observes and estimates certain states and conditions of the free piston energy converter 1. FIG. 5 shows the main components of the observer 60 which are an ignition time estimator 61, a piston state estimator 62 and an output power estimator 63. Furthermore, a converter device 64 is provided for converting a value of an estimated velocity into a value of an estimated kinetic energy $E_{kjn}$.

The observer 60 comprises three inputs A, B, C which connect sensor outputs of the free piston energy converter 1 with the piston state estimator 62. The first input A receives switching signals of the Hall effect sensor $x_{hall}$ effected by the piston. The second input B receives the current (present) value of the electromagnetic force $F_{el}$ acting on the piston. The second input B is as well connected with the output power estimator 63. The third input C receives the current (present) value of the pressure P within the cylinder.

As mentioned above, the position and velocity of the moving mass and especially of the pistons is estimated by the observer 60 on the basis of a physical model of how the moving mass is moving with respect to the applied forces. This is carried out by means of the piston state estimator 62 on the basis of the received three input signals A, B, C and is described in more details below.

The ignition time is calculated by the ignition time estimator 61 in dependence of the position, velocity and pressure, which are estimated by the piston state estimator 62 and provided to the inputs of the ignition time estimator 61. This calculation is done on the basis of measuring the time between the peak pressure and the top dead center (TDC) or the bottom dead center (BDC) of the piston which is quite straightforward for a person skilled in the art. However some observations can be made and should be considered:

- the quality of the estimation is related to the sampling frequency of the controller 50; and
- simulations show that the present feedback controller may suffer a problem if there is no ignition. This might be the case during start-up or if there is a misfire. For avoiding such problems, preferably an ignition observer is introduced which sets a flag indication whether an ignition has occurred or not.

The observer 60 comprises five outputs D, E, F, G, H. Via the first output D and the second output E the estimated position x of the piston and the estimated kinetic energy Ek, respectively, are provided to the stabilizing compensator 52. The estimated kinetic energy Ek is provided from the second output E to the servo compensator 53 as well.

The estimated output power P is provided from the third output F to the first summation device 81. The ignition time is submitted from the fourth output G of the observer 60 to the second summation device 71. Finally the estimated pressure p is provided via the fifth output H of the observer 60 to the stabilizing compensator 52.

Estimating the position and velocity of the moving mass and especially of the piston by the piston state estimator 62 is very important for the method and system of the invention. In this free piston engine or energy converter 1 the position of the moving mass is measured with Hall effect sensors (or other sensors). These sensors flag and generate a signal when for example the magnets on the moving mass pass the sensor. The problem however is to estimate the position and velocity of the moving mass at any time instant and not just when the Hall effect sensors generate a signal.

Figure 6:
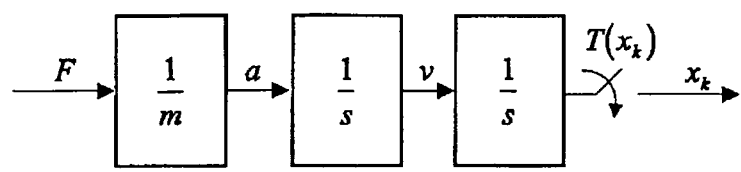
FIG. 6 a schematic view of a model of the piston movement.

The basic idea is to estimate the motion of the moving mass by considering the total forces Ftotai acting on the moving mass. The most significant forces are the electromagnetic force and the forces due to the cylinder pressure. According to FIG. 6 the piston state estimator 62 is based on the model of a double integrator which integrates the total force for obtaining the position x and velocity v of the moving mass. In the field of control engineering this kind of estimation problem is often solved by a Kalman filter. In this case the use of a Kalman filter is well motivated since the motion of the piston is a linear function of the applied forces. However other filters can be used as well.

Figure 7:
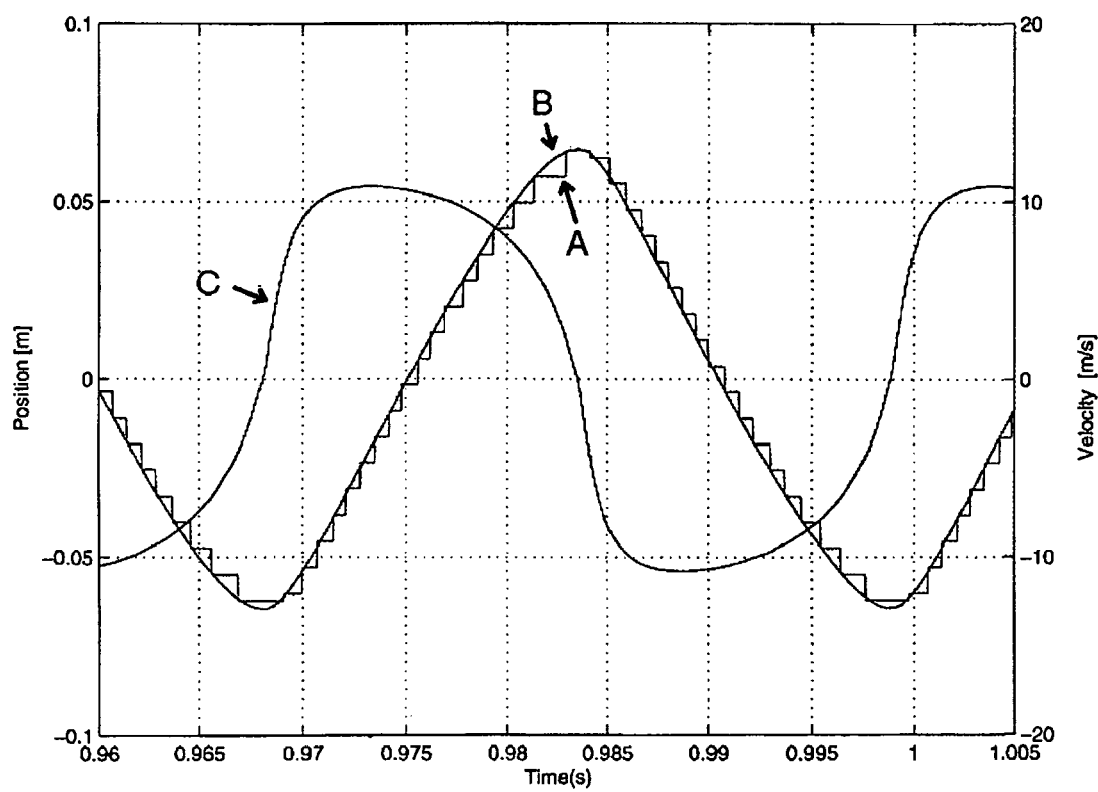
FIG. 7 the results of the inventive simulation of an estimated position and velocity of a moving mass in a free piston energy converter.

A challenging problem with the using of Hall effect position sensors is the fact that they are not time triggered but event triggered. This means that the position measurements are only accurate when they are generated and that they are not updated synchronously. However for a Kalman filter time triggered signals are needed. To solve this problem a time varying Kalman filter can be used. FIG. 7 shows a simulation example in which the filter estimates the position and velocity of the moving mass. In this figure the staircase plot A denotes the output signals of the Hall effect sensors and curve B denotes the position estimated by the Kalman filter. Curve C is the estimated velocity of the moving mass.

In the following the time varying Kalman filter shall be described in more details.

Given a discrete-time model $$x(k+1) = Fx(k) + Gu(k) + v(k)(14) y(k) = C(k)x(k) + w(k) \quad (15)$$

with the following covariance matrices of the process disturbances and measurement noise:

$$E\{v(k)v^T(l)\} = R_2\delta_{kl}$$

$$E\{w(k)w^T(l)\} = R_2\delta_{kl}$$

the Kalman filter is given by:

$$x(k+1) = Fx(k) + Gu\{k\} + K(k)(y(k) - Cx(k)) \quad (16)$$

Here the gain K(k) is given by:

$$K(k) = FP(k)C^T(CP(k)C^T + R_2)^{-1} \quad (17)$$

where P(k) is the solution to the following Riccati equation:

$$P(k+1) = FP(k)F^T - FP(k)C^T(CP(k)C^T + R_2)^{-1}CP(k)F^T + R_1 \quad (18)$$

Usually the steady state solution of the Kalman filter is implemented, i.e. (18) is solved as an algebraic equation $$P = \lim_{k \to \infty} P(k)$$

However, note that the Kalman filter (16) is also valid for a time-varying system

[FCk), G(k), C(k), D(k)]

with time-varying covariance matrices $R_1(k)$ and $R_2(k)$. In such case there exists no steady state solution of (18).

In the free piston energy converter engine the dynamics of moving mass is given by $$\ddot{x} = F/m \tag{19}$$

where x denotes the position, F denotes the applied forces on the moving mass m. The problem is to estimate the velocity x* based on position measurements and force estimates. The Kalman filter is a suitable observer for this application since (19) is linear.

Let (14) and (15) be the discrete-time representation of (19) where u is the applied force and y is the position measurements. A problem is that the position measurements are not updated at each sample. Furthermore, the positions measurements are not sampled synchronously. This problem can be solved by considering a time-varying $R_2$ matrix:

$R_2(k) = \{\infty$ when position is not updated $\epsilon$ when the position is updated The variation of $R_2(k)$ can be interpreted in the following way: when $R_2 = V$ no measurement information is available, whereas when $R_2 = \epsilon$ the measurement is very accurate with insignificant noise. An equivalent description of this is to let $R_2 = \epsilon Vk$ and vary the C-matrix in the following way:

$C(k) = \{0$ when position is not updated

C when the position is updated

Solution of Riccati equation:

$$\text{Let } F = \begin{bmatrix} 1 & 0 \\ h & 1 \end{bmatrix} \quad C = [0 \quad c_{12}]$$

Here h denotes the sampling rate and $c_{12}$ equals 1/m. Then $$FPF' = \begin{bmatrix} 1 & 0 \\ h & 1 \end{bmatrix} \begin{bmatrix} p_{11} & p_{12} \\ p_{12} & p_{22} \end{bmatrix} \begin{bmatrix} 1 & h \\ 0 & 1 \end{bmatrix}$$

$$= \begin{bmatrix} p_{11} & p_{12} \\ hp_{11} + p_{12} & p_{12}h + p_{22} \end{bmatrix} \begin{bmatrix} 1 & h \\ 0 & 1 \end{bmatrix}$$

$$= \begin{bmatrix} p_{11} & hp_{11} + p_{12} \\ hp_{11} + p_{12} & h^2 p_{11} + 2p_{12} + p_{22} \end{bmatrix}$$

and $$FPC' = \begin{bmatrix} p_{11} & p_{12} \\ hp_{11} + p_{12} & p_{12}h + p_{22} \end{bmatrix} \begin{bmatrix} 0 \\ c_{12} \end{bmatrix} = \begin{bmatrix} p_{12} \\ p_{12}h + p_{22} \end{bmatrix} c_{12}$$

$$FPC'CPF' = \begin{bmatrix} p_{12} \\ p_{12}h + p_{22} \end{bmatrix} c_{12} [p_{12} \quad p_{12}h + p_{22}] c_{12}$$

$$= \begin{bmatrix} p_{12}^2 & p_{12}(p_{12}h + p_{22}) \\ p_{12}(p_{12}h + p_{22}) & (p_{12}h + p_{22})^2 \end{bmatrix} c_{12}^2$$

and $$CPC' + R_2 = [0 \quad c_{12}] \begin{bmatrix} p_{11} & p_{12} \\ p_{12} & p_{22} \end{bmatrix} \begin{bmatrix} 0 \\ c_{12} \end{bmatrix} + R_2 = p_{22} c_{12}^2 + R_2$$

Hence $$FPF' - FPC(CPC' + R_2)^{-1} CPF' + R_1 =$$

$$= \begin{bmatrix} p_{11} & hp_{11} + p_{12} \\ hp_{11} + p_{12} & h^2 p_{11} + 2p_{12} + p_{22} \end{bmatrix}$$

$$- \frac{c_{12}^2}{p_{22} c_{12}^2 + R_2} \begin{bmatrix} p_{12}^2 & p_{12}(p_{12}h + p_{22}) \\ p_{12}(p_{12}h + p_{22}) & (p_{12}h + p_{22})^2 \end{bmatrix}$$

According to FIG. 5 the pressure signals are not filtered in this embodiment of the observer 60. However there are two reasons that implementing an intelligent and model based filtering of the pressure signals might be advantageous. One reason is that experimental data indicate that the pressure signals may be subjected to disturbances and/or measurement noise. Another reason is that simulations have shown that the control system (especially the feedback) is sensitive to disturbances of the pressure signal. One possibility for solving this problem is to combine the filtering of the pressure signals with the estimation of the position and velocity of the moving mass by means of the piston state estimator 62. This could be done by using the equation (7) above. Hence this approach would lead to a model based filtering of the pressure signals.

Various alternative approaches are possible:

Instead of the above mentioned velocity or kinetic energy, the peak pressure within the cylinder can be used as a control variable as well. This has the advantage that it is a more simple solution, however it is less robust against disturbances.

Instead of Hall effect sensors other position sensors can be used for detecting the position of the moving mass.

Instead of using an ignition servo controller 70, it is possible to use other suitable control variables as well. An alternative would be e.g. to replace the ignition time controller with a peak pressure controller that gives a reference value to the velocity servo.

The position and velocity of the moving mass can be as well estimated by analyzing the terminal values of the electrical machine and for example the phase of the voltage and/or the phase of the current at/through the coil 40. A possible advantage is that less reliance on Hall effect sensors and less reliance on pressure sensors is necessary.

Figure 8:
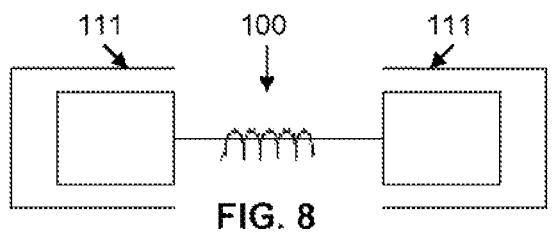
FIG. 8 a schematic view of a structure of a first free piston energy converter.

The above described method and system is especially designed for the free piston energy converter with two pistons and a two-stroke combustion. However the inventive methods and system can be used for controlling many different designs of free piston machines. FIGS. 9 to 12 show some of such examples in comparison to the above described two combustion chambers 111 and two-stroke combustion design with an electrical machine 100 in-between according to FIG. 8.

Figure 9:
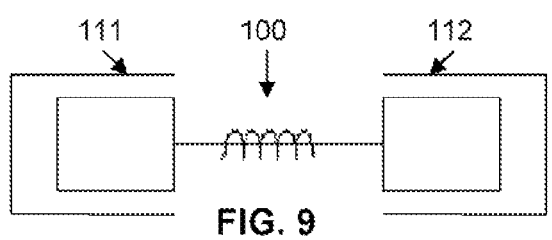
FIG. 9 a schematic view of a structure of a second free piston energy converter.
Figure 10:
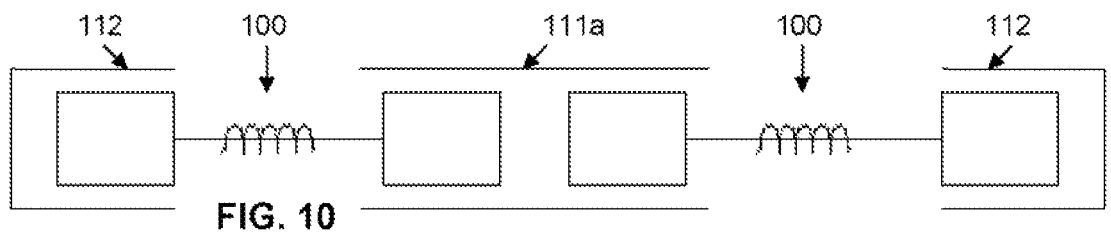
FIG. 10 a schematic view of a structure of a third free piston energy converter.

According to FIG. 9 a converter is provided with one combustion chamber 111 on one side, a gas spring 112 for guiding and dampening the free piston on the other side and an electrical machine 100 in-between both. FIG. 10 shows an embodiment in which one combustion chamber 111a with two pistons is provided wherein each piston is guided by means of a gas spring 112 on both sides and controlled each by an electrical machine 100 at each of the pistons. Alternatively to FIG. 10 instead of the gas springs combustion chambers could be provided as well on both sides.

Figure 11:
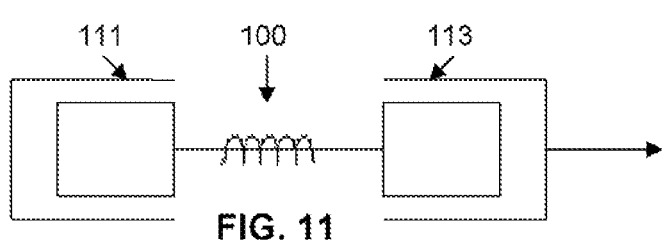
FIG. 11 a schematic view of a structure of a fourth free piston energy converter.
Figure 12:
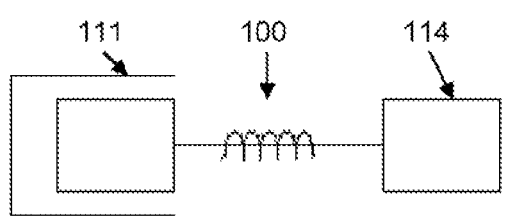
FIG. 12 a schematic view of a structure of a fifth free piston energy converter.

FIG. 11 shows an embodiment of a pneumatic free piston engine which comprises a combustion chamber 111 on one end and a compressor 113 for compressing air, hydrogen or other media on the other side with an electrical machine 100 in-between. The main purpose for the electrical machine is in these cases to make it possible to control the free piston engine. FIG. 12 shows an embodiment of a hydraulic free piston engine which comprises a combustion chamber 111 on one end and a hydraulic actuator 114 on the other end with an electrical machine 100 in-between. However in this case a hydraulic activator can be used instead of an electrical machine as well. The output is hydraulic energy. In these cases the control system can use the hydraulic actuator instead of the electrical machine. As an alternative it is possible to add a small electrical machine between both for control purposes besides the hydraulic actuator.

The inventive control system is very flexible to include a variety of fast as well as slow inputs like sensors and outputs like actuators. This makes it possible to use the control system for complete engine control. The inventive control system can be used to control different combustion processes (two or four stroke) like HCCI, Diesel, Spark ignition and different fuels like petrol, diesel, natural gas and hydrogen.

The inventive method and system can be used for controlling non-free piston machines or converters as well. In these cases the piston motion itself cannot be controlled as in a free piston machine. However, fuel injection timing, valve opening timing and spark (if any) ignition timing are examples of possibilities to be used for fast control. If the engine is equipped with ISG (Integrated Starter Converter) it can be included in the control system.

Furthermore, there are crankshaft engines with the possibility to change the compression ratio, usually very slow (several seconds).

The proposed control system is very flexible to include a variety of fast as well as slow inputs (sensors) and outputs (actuators). This makes it possible to use the control system for complete engine control.

A program for operating the system according to aspects of the present invention, or components of the system, can be downloaded to the system via a computer connected to, for example, the interne.

The invention claimed is:

1. Method for controlling a free-piston energy converter by an electromagnetic force exerted onto a moving mass of the converter, by which method effects of disturbance events in at least one of at least two cylinders are decoupled from each other, comprising the following steps:
predicting future forces acting on the moving mass of the converter during a stroke of the moving mass, wherein predicting future forces is conducted based on at least one of certain present states and conditions within the converter for a first position of the moving mass,
evaluating or estimating on the basis of the predicted future forces a value for generating the electromagnetic force which is exerted onto the moving mass, so that the moving mass reaches a desired reference condition or state at a certain position along the stroke; and
repeating the steps of predicting and evaluating or estimating for a second position of the moving mass along its stroke.

2. Method according to claim 1, wherein the desired reference condition or state is a desired reference kinetic energy.

3. Method according to claim 1, wherein a future development or future values of the future forces acting on the moving mass of the converter are predicted based on at least one of an evaluation of at least one of an observed and estimated certain present condition or state within the free piston energy converter.

4. Method according to claim 1, wherein the electromagnetic force acting on the moving mass of the converter and a fuel input to the converter are control variables and an ignition time and a output power of the converter are output values to be controlled by the variables.

5. Method according to claim 1, wherein the electromagnetic force which is exerted onto the moving mass is evaluated or estimated based on a physical model of the moving mass and on at least one of pressure- and position- and velocity-signals within the free piston energy converter.

6. Method according to claim 5, wherein the physical model for evaluating or estimating at least one of the position and velocity of the moving mass of the converter is based on how the mass is moving with respect to the applied total forces.

7. Method for controlling a free-piston energy converter by an electromagnetic force exerted onto a moving mass of the converter, by which method effects of disturbance events in at least one of at least two cylinders are decoupled from each other, comprising the following steps:
predicting future forces acting on the moving mass of the converter during a stroke of the moving mass, wherein predicting future forces is conducted based on at least one of certain present states and conditions within the converter, and
evaluating or estimating on the basis of the predicted future forces a value for generating the electromagnetic force which is exerted onto the moving mass, so that the moving mass reaches a desired reference condition or state at a certain position along the stroke,
wherein the electromagnetic force which is exerted onto the moving mass is evaluated or estimated based on a physical model of the moving mass and on at least one of pressure- and position- and velocity-signals within the free piston energy converter, and the physical model for evaluating or estimating the pressure is based on a filtering of pressure signals generated by pressure sensors within at least one cylinder of the converter.

8. Method according to claim 1, wherein the electromagnetic force which is exerted onto the moving mass is evaluated by the following steps:
(1) measuring or estimating present values of kinetic energy or velocity of the moving mass and pressure within a cylinder at a first position;
(2) considering a desired future reference kinetic energy of the moving mass near an end of the stroke or at a certain position;
(3) predicting a constant electromagnetic force and exerting the same onto the moving mass, so that the desired future reference kinetic energy of the moving mass will be reached at the end of the stroke or at the certain position on based on values measured or estimated under step (1) above; and
(4) jumping back to step (1) and repeating the procedure for a second position of the moving mass.

9. System for controlling a free-piston energy converter for conducting a method according to claim 1 comprising a velocity servo controller for predicting future forces acting on the moving mass of the converter and for at least one of evaluating and estimating a value for generating an electromagnetic force which is exerted onto the moving mass, so that the moving mass reaches a desired reference condition or state, like a desired reference kinetic energy, at a certain position along the stroke.

10. System according to claim 9, comprising an observer for at least one of observing and estimating certain present states and conditions within the free piston energy converter which are evaluated by the velocity servo controller for predicting a future development or future values of the future forces acting on the moving mass.

11. System according to claim 9, wherein the velocity servo controller comprises a stabilizing compensator which receives input signals indicating an estimated pressure within a cylinder, an estimated kinetic energy of the moving mass at an estimated (current) position and a value of a desired reference kinetic energy of the moving mass at a certain position along the stroke and wherein the stabilizing compensator is provided for outputting a value of an electromagnetic force to be exerted onto the moving mass.

12. System according to claim 9, wherein the observer comprises an ignition time estimator, a piston state estimator and an output power estimator.

13. System according to claim 12, wherein the piston state estimator receives switching signals of a Hall effect sensor effected by the moving mass, the present value of the electromagnetic force acting on the moving mass and the present value of the pressure within the cylinder, for evaluating an estimated position and an estimated kinetic energy of the moving mass.

14. System according to claim 9, comprising an ignition time controller and an output power controller.

15. Free-piston energy converter comprising a system for controlling a free-piston energy converter for conducting a method according to claim 1.

16. An arrangement comprising
   a system for controlling a free-piston energy converter for conducting a method according to claim 1 and a computer connected to the internet and arranged to download from the interne a computer program to at least one of the system and a component of the system, the computer program being adapted to perform the method or for use in a method according to claim 1.

17. Computer program product stored on a computer readable medium, comprising computer program code adapted to perform a method or for use in a method according to claim 1.

* * * * *